United States Patent [19]

Klossner et al.

[11] Patent Number: 4,954,329
[45] Date of Patent: Sep. 4, 1990

[54] PROCESS AND APPARATUS FOR PREPARATION OF FINELY GRAINED LEAD AZIDE

[75] Inventors: Botho Klossner, Hilterfingen; Paul Lörtscher, Brenzikofen, both of Switzerland

[73] Assignee: Schweizerische Eidgenossenschaft, Thun, Switzerland

[21] Appl. No.: 380,303

[22] Filed: Jul. 17, 1989

[30] Foreign Application Priority Data

Jul. 28, 1988 [CH] Switzerland ............... 02882/88

[51] Int. Cl.$^5$ ............................................. C01B 21/08
[52] U.S. Cl. .................................. 423/410; 422/135; 422/226
[58] Field of Search ................................. 423/410

[56] References Cited

U.S. PATENT DOCUMENTS

| | | | |
|---|---|---|---|
| 1,353,805 | 9/1920 | Snelling | 423/410 |
| 1,914,530 | 6/1933 | Rinkenbach | 423/410 |
| 2,421,778 | 6/1947 | Fleischer et al. | 423/410 |
| 3,264,150 | 8/1966 | Leslie | 423/410 |
| 3,361,602 | 1/1968 | Leslie | 423/410 |

FOREIGN PATENT DOCUMENTS

| | | | |
|---|---|---|---|
| 569833 | 2/1959 | Canada | 423/410 |
| 1044047 | 11/1958 | Fed. Rep. of Germany | 423/410 |
| 1194381 | 6/1965 | Fed. Rep. of Germany | 423/410 |
| 160953 | 4/1921 | United Kingdom | 423/410 |
| 359659 | 10/1931 | United Kingdom | 423/410 |
| 1045271 | 10/1966 | United Kingdom | 423/410 |

Primary Examiner—Robert L. Stoll
Assistant Examiner—Wayne A. Langel
Attorney, Agent, or Firm—Allegretti & Witcoff Ltd.

[57] ABSTRACT

The invention provides a process for the preparation of finely grained lead azide, in which aqueous solutions of lead nitrate and sodium azide are stirred in a vessel at constant temperature, characterized in that in a first process step the aqueous solution of lead nitrate and a small amount of an aqueous solution of sodium citrate are poured into the vessel, in a second process step, the aqueous solution of sodium azide is dosed into the vessel over a period of time of 30 to 40 minutes, the aqueous solutions poured into the vessel are agitated at a peripheral stirring speed of between 0.2 m/sec and 1.0 m/sec., and the constant temperature is set to a value of 50° C. to 80° C.

5 Claims, 2 Drawing Sheets

PROCESS AND APPARATUS FOR PREPARATION OF FINELY GRAINED LEAD AZIDE

BACKGROUND OF THE INVENTION

The present invention relates to a process for the preparation of finely grained lead azide, in which aqueous solutions of sodium azide and lead nitrate are stirred in a container at a constant temperature, and an apparatus for the preparation of finely grained lead azide according to the invention.

A process for preparation of lead azide is known from the book "Chemistry and Technology of Expolosives" Vol. 3, by T. Urbanski, Pergamon Press 1967, pp. 178, 179. Per batch, lead nitrate in a 9–10% aqueous solution is filled into an open reaction vessel. At a temperature of 50° C., this solution is neutralized with sodium hydroxide until a pH-value of 4.0 is arrived at, as indicated by a color change of methyl orange. A small quantity of dextrine is added, to interfere with the crystal growth of the precipitating lead azide. Then, sodium azide in a 2.7 to 3.0% aqueous solution is added. This solution should be alkaline as indicated by phenolphthalein. Alkalinity is adjusted with a 1N-solution of sulfuric acid. If alkalinity is too low, a calculated quantity of sodium hydroxide is added. This mixture is stirred for an hour at a constant temperature of 50° C. Subsequently, the stirrer is stopped and lead azide precipitates from the solution. The agitator is removed upwardly and the reaction vessel is tilted sideways, so that the lead azide can be filtered off. The lead azide is then washed in water, dried and sieved. The yield of the lead azide produced in this manner is 99%.

The above-described process of preparation of lead azide is so costly because, as is known, with crystalline lead azide, the mere breaking of the crystal needles is liable to trigger an explosion. The necessary additives such as dextrine, polyvinyl alcohol or the like result in the formation of polymorphous lead azide. This has the serious disadvantage of impairing pourability and, thus, dosing of the lead azide in the manufacture of ammunition. What is more, the above-described method of preparation does not fully preclude crystallization of the lead azide, so that a considerable amount of crystal needles with high frictional, impact and temperature sensitivity are still present. The differing particle sizes of the thus produced lead azide also impair fluidity. Another disadvantage of the known process resides in the fact that reaction sets in only after seeding of the solution mixture. Lead content of the waste water amounts to about 13 gr/l, constituting a considerable environmental load.

It is an object of the invention to provide a process and an apparatus for the preparation of finely grained lead azide, wherein the lead azide produced is in the form of a granulate of approximately spherical particles, to obtain better fluidity and less sensitive handling of the lead azide. Also, a reduction of lead-containing waste water is aimed at.

In a process of the preparation of finely grained lead azide, in which aqueous solutions of sodium azide and lead nitrate are continuously stirred in a vessel at constant temperature, this is achieved in that in a first process step the aqueous solution of lead nitrate and a small amount of an aqueous solution of sodium citrate are poured into the vessel;

in a second process step, the aqueous solution of sodium azide is dosed into the vessel over a period of time of 30 to 40 minutes;

the aqueous solutions poured in the vessel are stirred at a stirring speed of between 0.2 m/sec and 1.0 m/sec, and the constant temperature is set to a value of 50° C. to 80° C., preferably to 70° C.

The device for the preparation of finely grained lead azide according to this process comprises a cylindrical vessel with a hemispherical bottom and an agitator (also known as stirrer) disk with twisted blades, with the disk being disposed in the lower third of the aqueous solutions filled into the vessel. This largely prevents crystal deposits on the vessel walls.

An important advantage of the invention resides in the fact that the preparation process is significantly simpler and the process steps result in a very uniform and finely grained lead azide crystallization. There is no need to adjust the pH-value of the mixture, as the sodium citrate added acts as a weak buffer. Also, the citrate anion and the lead cation form a weak complex bond, slowing down the reaction between lead and azide. Of particular importance is the fact that the aqueous solution of sodium azide is added during 30 to 40 minutes, preferably 35 minutes, in order to prevent the undesirable formation of undefined crystal agglomerates. As reaction takes place without seeding, this constitutes a further simplification of the process. Because of the higher ratio: azide/lead, the lead content of the waste water is significantly lower than with the conventional process.

Another advantage of the present invention is the fact that now the vessel need no longer be tilted, as the finely grained lead azide is discharged in suspension via a discharge valve in the vessel bottom. This facilitates a substantially more rational and faster production.

A further advantage of the invention pertains to the use of an aqueous solution with 5–7 wt.-%, preferably 6 wt.-% lead nitrate, an aqueous solution with 6–8 wt.-%, preferably 7 wt.-% sodium citrate, and an aqueous solution with 2–4 wt.-%, preferably 3 wt.-% sodium azide. With this composition, it was seen that lead content in the waste water is only about 30% of that resulting from the conventional preparation process.

Experience has shown a stirring speed of 0.5 m/sec to 0.7 m/sec gives good results, producing a very homogeneous granulate with approximately spherical lead azide particles.

In an advantageous design of the apparatus for the preparation of finely grained lead azide, the stirrer blades are set each at an angle of 5° to 15°, preferably 10°, with the horizontal. This precludes crystallization of the lead azide. At the same time, formation of undesirable agglomerates is prevented by the high stirring velocity of the stirrer.

The inlet nozzles for the dosing of the sodium azide are advantageously arranged in the upper region of the vessel and at an angle to the horizontal of 60° to 80°, preferably 70°, so that a very uniform and controllable mixing action is ensured.

The discharge valve is advantageously desired as a valve cone movable upwards and downwards on a spindle, which valve cone matches a valve seat inwardly tapering in the vessel bottom.

Other objects and advantages will become apparent in the description below.

BRIEF DESCRIPTION OF THE DRAWINGS

There is shown in the attached drawings a presently preferred embodiment of the present invention, wherein like numerals in the various views relate to like elements and wherein.

DETAILED DESCRIPTION OF THE INVENTION

Figures 1, 2:
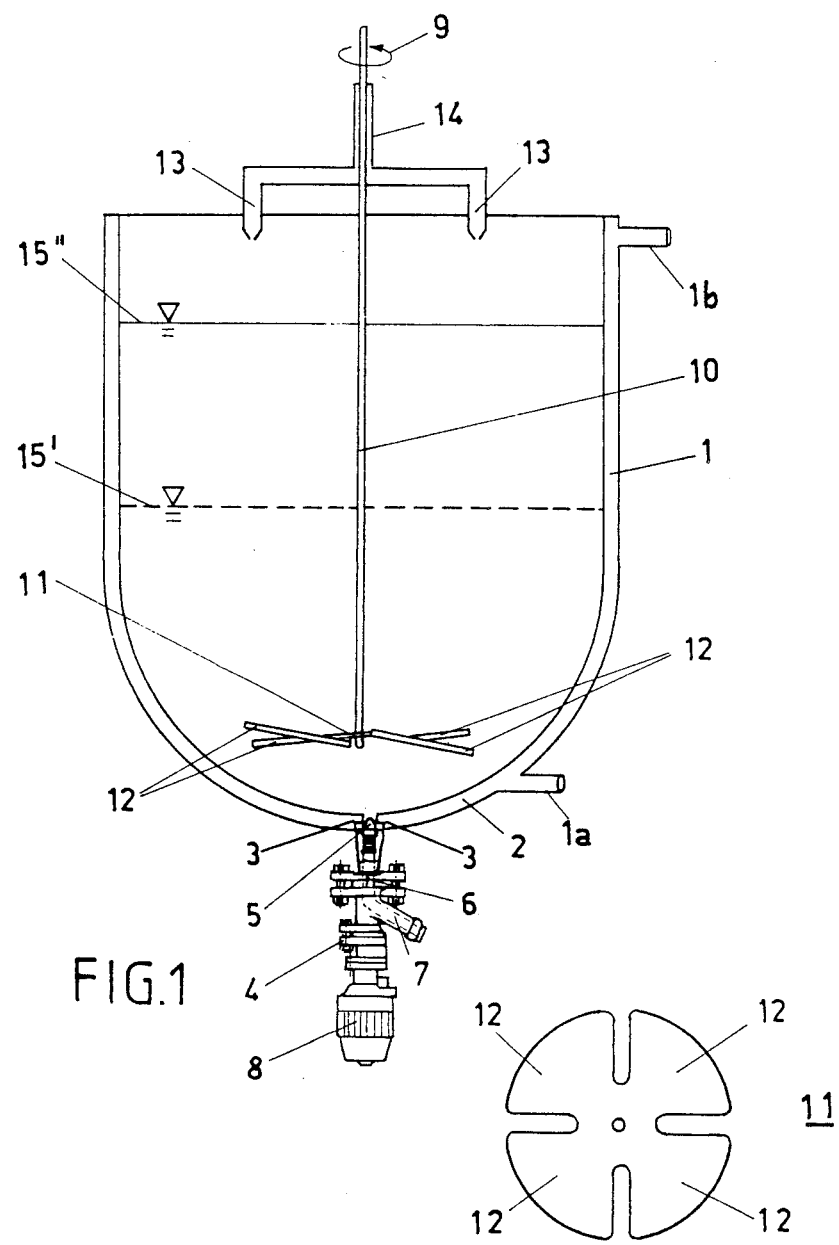
FIG. 1 schematically illustrates a vessel with a rod stirrer and a discharge valve.
FIG. 2 is a top view of the stirrer disk.

FIG. 1 shows an open, cylindrical, double-walled vessel 1 of a diameter of 50 cm, provided with a lower inlet nozzle 1a and an upper outlet nozzle 1b for temperature control by means of water circulation. The vessel bottom 2 is hemispherical. An inwardly tapering opening defining a valve seat 3, is arranged in the vessel bottom. At this point, a discharge valve 4 is welded to the vessel, which valve consists essentially of a valve cone 5 with a spindle 6, and is provided with a lateral, downward pointing discharge nozzle 7. The spindle 6 is threaded and can be moved upwards and downwards in the housing of the valve 4 by means of a knob 8. With the discharge valve 4 closed, the valve cone 5 tightly seals the valve seat 3.

Figure 4:
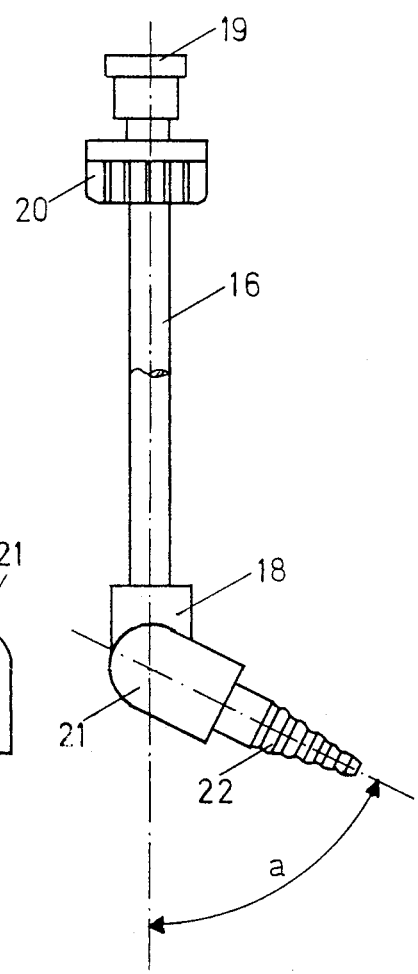
FIG. 4 is a side view of the inlet tube of FIG. 3.

In the vessel 1, there is centrally arranged a rod stirrer or stirrer, comprising a motor (not shown), a stirrer rod 10 and a stirrer disk 11. The latter has four twisted blades 12, each forming with the horizontal an angle of 5° to 15° with the preferred angle being 10°. The blades 12 are sector-shaped (FIG. 2). The stirrer disk 11 has a diameter of 16 cm and is located about 6 cm about the vessel bottom 2. The stirrer disk 11 is preferably located in the lower third of the aqueous solutions contained in the vessel 1. In the upper region of the vessel 1, there are arranged, fork-like about the stirrer rod 10, two inlet nozzles 13, mounted on a common T-shaped inlet tube 14. The inlet nozzles 13 have outlet openings of a diameter of 3 mm and point downwards at an angle of 60° to 80° with respect to the vertical. In a preferred embodiment as shown in FIG. 4, the angle of the nozzles 13 with respect to the vertical is 64°. The inlet tube 14 and the inlet nozzles 13 are made of PVC.

Using the above-described vessel, the process of the preparation of finely grained, finely distributed lead azide is carried out as follows:

The discharge valve 4 is closed and an aqueous solution of lead nitrate with a pH-value of 3.8 to 4.0, and an aqueous sodium citrate solution are introduced into the vessel 1, up to the level 15'. Used are 10.5 liter of a solution with 5–7 wt.-% lead nitrate, preferably 6.0 wt.-% lead nitrate and 0.03 liter of a solution with 6–8 wt.-% sodium citrate, preferably 6.75 wt.-% sodium citrate. The peripheral stirring speed of the stirrer disk 11 is set to 0.2 to 1.0 m/sec, preferably to 0.5 to 0.7 m/sec. The peripheral stirring speed is defined as the linear speed at the edge of the stirrer disk 11 and is calculated as the product of radius and angular velocity of the agitator disk 11. A constant peripheral stirring speed makes sure that turbulence of the solution mixture at the walls of the vessel 1 remains unchanged even with varying sizes of the vessel 1.

Subsequently, an aqueous solution of sodium azide is introduced at controlled rates into the stirred solution mixture via the T-shaped inlet tube 14 and the inlet nozzles 13. The solution contains 2–4 wt.-% sodium azide, preferably 3.0 wt.-% sodium azide, and introduction takes places over a period of time of about 33 minutes, i.e., until 7.5 liter are introduced into the solution mixture and the liquid level has reached position 15'' (FIG. 1). Controlling temperature and stirring speed of the solution mixture, it is possible to control the shape of the agglomerates formed. Irregular, crystalline agglomerates are formed particularly when stirring speeds are below 0.5 m/sec. At stirring speeds, above 0.7 m/sec, spherical agglomerates are formed, with a large proportion of small lead azide crystals. During the entire mixing process, the temperature of the vessel 1 and, thus, of the solution mixture, is set to a value of between 50° C. and 80° C., preferably to 70° C. At a temperature below 60° C., rod-shaped agglomerates are formed. By selection of temperature, the shape of the agglomerates can be influenced. Because of the buffer effect of sodium citrate, checking of the pH-value can be dispensed with.

Due to the continuous rapid mixing, the crystalline reaction product, i.e., the lead azide granules, is very homogeneously distributed throughout the entire vessel 1. One thus obtains uniformly distributed, spherical lead azide granules, without the usual crystal deposits on the vessel walls, and a high yield is obtained, i.e., about 91.3%. The thus prepared lead azide particles have a diameter of 100 μm to 200 μm, preferably about 150 μm. Lead content of the waste water is about 66.8 gr in 18 liters, or 3.7 gr/liter, which is about 30% of the lead content according to the conventional processes.

The mixing period having elapsed, addition of sodium azide solution is concluded, but the agitator disk 11 continues to rotate. The vessel 1 and the solution mixture therein are cooled down to between 35° C. to 25° C., preferably to about 30° C. and the solution mixture is drawn from the vessel 1 via the discharge valve 4.

By means of a filter, the lead azide particles are filtered out and washed in water. They are then dried under vacuum at a temperature of 50° C. With a view of their later use, the particles are then loosened by means of a sieve.

Figure 3:
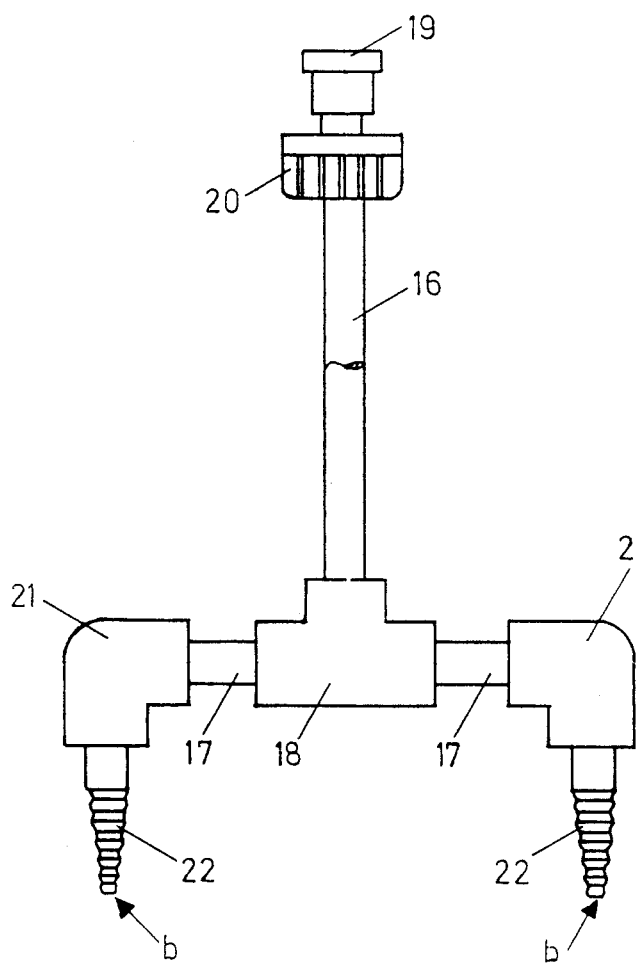
FIG. 3 represents a preferred design of an inlet tube.

The preferred embodiment of the T-shaped inlet tube 14 is seen in detail in FIGS. 3 and 4. It consists of commercially available tube components made of polyvinyl chloride (PVC) adhesively joined. A vertical tube 16 is joined to two horizontal tubes 17 by means of a T-fittings 18. At the two ends are located two elbow pieces 21 which end in outlet nozzles 22. The upper end of the vertical tube 16 is provided with a collar sleeve 19 and a union nut 20. The inside diameter of tubes 16 and 17 is 10 mm; the nozzle has a bore b of a diameter of 3 mm. The angle a in FIG. 3 is 64°.

While we have shown a presently preferred embodiment of the present invention, it will be understood that various changes and modification may be made therein without departing from the invention. Therefore, it is intended in the appended claims to cover all such changes and modifications as fall within the true spirit and scope of the invention.

We claim:

1. A process for the preparation of finely grained lead azide, in which aqueous solutions of lead nitrate and sodium azide are stirred in a vessel at constant temperature, characterized in that in a first process step the aqueous solution of lead nitrate and an aqueous solution of sodium citrate are poured into the vessel wherein the weight of sodium citrate is about 0.32% the weight of the lead nitrate; in a second process step, the aqueous solution of sodium azide is dosed into the vessel over a period of time of 30 to 40 minutes; the aqueous solutions poured into the vessel are stirred at a peripheral stirring speed of between 0.2 m/sec and 1.0 m/sec, and the constant temperature is maintained with a range of 50° C. to 80° C.

2. The process as claimed in claim 1, characterized in that, the period of time having elapsed, the aqueous solutions poured into the vessel are further stirred and the vessel is cooled down to a temperature of between 25° C. and 35° C., where the finely grained lead azide leaves the vessel in a suspension via a discharge valve attached to the vessel bottom.

3. The process as claimed in claim 2, characterized in that an aqueous solution with 5-7 wt.-% lead nitrate, an aqueous solution with 2-4 wt.-% sodium azide, and an aqueous solution with 6-8 wt.-% sodium citrate are used.

4. The process as claimed in claim 3, characterized in that the aqueous solutions are stirred at a peripheral stirring speed of 0.5 m/sec to 0.7 m/sec.

5. A process for the preparation of finely grained lead azide, in which aqueous solutions of lead nitrate and sodium azide are stirred in a vessel at constant temperature, characterized in that in a first process step about 10.5 parts by volume of the aqueous solution of 5-7 wt.-% of lead nitrate and about 0.03 parts by volume of an aqueous solution of 6-8 wt.-% of sodium citrate are poured into the vessel; in a second process step, about 7.5 parts by volume of an aqueous solution of 2-4 wt.-% of sodium azide is dosed into the vessel over a period of time of 30 to 40 minutes; the aqueous solutions poured into the vessel are stirred at a peripheral stirring speed of between 0.2 m/sec and 1.0 m/sec, and the constant temperature is maintained with a range of 50° C. to 80° C.

* * * * *